United States Patent
Vermeir et al.

(10) Patent No.: US 10,897,619 B2
(45) Date of Patent: Jan. 19, 2021

(54) COMPLEXITY CONTROL OF VIDEO CODEC

(71) Applicant: BARCO NV, Kortrijk (BE)

(72) Inventors: Thijs Vermeir, Staden (BE); Jurgen Slowack, Temse (BE)

(73) Assignee: BARCO NV, Kortrijk (BE)

( * ) Notice: Subject to any disclaimer, the term of this patent is extended or adjusted under 35 U.S.C. 154(b) by 131 days.

(21) Appl. No.: 16/087,680

(22) PCT Filed: Mar. 23, 2017

(86) PCT No.: PCT/EP2017/057031
§ 371 (c)(1),
(2) Date: Sep. 24, 2018

(87) PCT Pub. No.: WO2017/162845
PCT Pub. Date: Sep. 28, 2017

(65) Prior Publication Data
US 2019/0098316 A1    Mar. 28, 2019

(30) Foreign Application Priority Data

Mar. 25, 2016  (GB) .................... 1605130.2

(51) Int. Cl.
| | |
|---|---|
| *H04N 19/147* | (2014.01) |
| *H04N 19/11* | (2014.01) |
| *H04N 19/109* | (2014.01) |
| *H04N 19/19* | (2014.01) |
| *H04N 19/127* | (2014.01) |
| *H04N 19/103* | (2014.01) |
| *H04N 19/46* | (2014.01) |
| *H04N 19/96* | (2014.01) |

(52) U.S. Cl.
CPC ......... *H04N 19/147* (2014.11); *H04N 19/103* (2014.11); *H04N 19/109* (2014.11); *H04N 19/11* (2014.11); *H04N 19/127* (2014.11); *H04N 19/19* (2014.11); *H04N 19/46* (2014.11); *H04N 19/96* (2014.11)

(58) Field of Classification Search
None
See application file for complete search history.

(56) References Cited

U.S. PATENT DOCUMENTS

| | | | | |
|---|---|---|---|---|
| 2006/0171456 A1* | 8/2006 | Kwon | ................... | H04N 19/197 375/240.03 |
| 2008/0112481 A1* | 5/2008 | Hsaing | ................. | H04N 19/109 375/240.03 |

(Continued)

OTHER PUBLICATIONS

International Search Report for PCT/EP2017/057031, dated Jun. 14, 2017.

(Continued)

*Primary Examiner* — William C Vaughn, Jr.
*Assistant Examiner* — Joseph Daniel A Towe
(74) *Attorney, Agent, or Firm* — Bacon & Thomas, PLLC

(57) ABSTRACT

Means for controlling the computational complexity related to video encoding that includes a dynamic rate distortion cost error threshold and constrains the encoding complexity to a given complexity target. The solution is selective and provides fast convergence while incurring only a limited loss in rate distortion performance.

17 Claims, 11 Drawing Sheets

(56) References Cited

U.S. PATENT DOCUMENTS

| | | | | |
|---|---|---|---|---|
| 2015/0229931 A1* | 8/2015 | Fremlin | ............... | H04N 19/154 375/240.02 |
| 2016/0044340 A1* | 2/2016 | Bhaktavathsalam | ....................... | H04N 19/137 375/240.12 |
| 2016/0248933 A1* | 8/2016 | Yamada | ............... | H04N 1/4053 |
| 2017/0195675 A1* | 7/2017 | Seok | .................... | H04N 19/103 |

OTHER PUBLICATIONS

Written Opinion for PCT/EP2017/057031, dated Jun. 14, 2017.
International Preliminary Report on Patentability for PCT/EP2017/057031, dated May 9, 2018.
Guillaume Laroche et al., Encoder speed-up for the Motion Vector predictor cost estimation, Joint Collaborative Team on Video Coding (JCT-VC) of ITU-T SG16 WP3 and ISO/IEC JTC1/SC29/WG11 and ITU-T SG. 16, pp. 1-5, Jan. 20, 2012.
Thijs Vermeir et al., Real-Time Complexity Constrained Encoding, 2016 IEEE International Conference on Image Processing (CIP), IEEE, pp. 819-823, Sep. 25, 2016.
Thijs Vermeir et al., Low Delay Complexity Constrained Encoding, 2016 Data Compression Conference (DCC), IEE, p. 635, Mar. 30, 2016.
Tiesong Zhao et al., Flexible Mode Selection and Complexity Allocation in High Efficiency Video Coding, IEEE Journal of Selected Topics in Signal Processing, vol. 7, No. 6, pp. 1135-1144, Dec. 1, 2013.
Guilherme Correa et al., Complexity scalability for real-time HEVC encoders, Journal of Real-Time Image Processing, Springer, DE, vol. 12, No. 1, pp. 107-122, Jan. 5, 2014.
Xiang Li et al., Rate-Complexity-Distortion Optimization for Hybrid Video Coding, IEEE Transactions on Circuits and Systems for Video Technology, IEEE Service Center, Piscataway, NJ, vol. 21, No. 7, pp. 957-970, Jul. 1, 2011.
F. Bossen, "Doc. JCTVC-L1100: Common test conditions and software reference configurations," JCTVC, Geneva, Switzerland, Tech. Rep., Jan. 2013, p. 1-4.

* cited by examiner $\sigma \leftarrow \sigma_0$
$equal\_sign \leftarrow True$
$function\ \text{UpdateThreshold}(C_T, C_R)$
$\quad if\ (\sigma \geq 0) \neq (C_R \geq C_T)\ then$
$\quad\quad \sigma \leftarrow \sigma\ /\ -2$
$\quad\quad equal\_sign \leftarrow False$
$\quad else$
$\quad\quad if\ equal\_sign\ then$
$\quad\quad\quad \sigma \leftarrow 2\sigma$
$\quad\quad end\ if$
$\quad\quad equal\_sign \leftarrow True$
$\quad end\ if$
$\quad E_T \leftarrow \max(0, E_T + \sigma)$
$end\ function$

Figure 3

| Sequence | Anchor | | | CCE | | |
|---|---|---|---|---|---|---|
| | ET (sec) | PSNR (dB) | Rate (Mbit/s) | ET (sec) | PSNR (dB) | Rate (Mbit/s) |
| basketballdrive | 65.56 | 42.69 | 55.04 | 40.26 | 42.59 | 53.13 |
| bqterrace | 73.89 | 42.93 | 135.55 | 39.95 | 42.62 | 137.52 |
| cactus | 77.09 | 41.70 | 92.99 | 40.10 | 41.57 | 94.52 |
| kimono | 53.71 | 43.63 | 12.69 | 39.87 | 43.59 | 12.49 |
| parkscene | 59.82 | 42.26 | 20.99 | 40.09 | 42.18 | 20.88 |

| Sequence | Proposed Method ||||||||  Fixed Complexity Reduction ||||
| | 80% || 60% || 40% || 20% || ESD[5] || MD2 ||
| | ET | BDR | ET | BDR | ET | BDR | ET | BDR | ET | BDR | ET | BDR |
|---|---|---|---|---|---|---|---|---|---|---|---|---|
| basketballdrive | 0.79 | 0.07 | 0.59 | 1.34 | 0.40 | 6.47 | 0.20 | 28.23 | 0.74 | 2.22 | 0.42 | 8.98 |
| bqterrace | 0.79 | 1.72 | 0.59 | 5.48 | 0.39 | 11.17 | 0.20 | 24.33 | 0.77 | 1.56 | 0.43 | 6.90 |
| cactus | 0.78 | 0.18 | 0.59 | 2.83 | 0.39 | 10.49 | 0.20 | 28.92 | 0.76 | 2.00 | 0.41 | 12.20 |
| kimono | 0.79 | 0.11 | 0.59 | 1.08 | 0.40 | 4.98 | 0.20 | 15.93 | 0.78 | 2.37 | 0.40 | 3.24 |
| parkscene | 0.79 | 0.00 | 0.59 | 3.45 | 0.40 | 13.52 | 0.20 | 35.55 | 0.69 | 2.28 | 0.43 | 14.18 |

COMPLEXITY CONTROL OF VIDEO CODEC

TECHNICAL FIELD

The present invention relates to methods, controllers and systems for complexity control of video codec using coding units, as well as software for implementing the methods or systems.

BACKGROUND OF THE INVENTION

In the field of video coding and high efficient video coding, the encoding application can be one of many processes running on the host machine. Other processes can run in parallel, including operating system processes, and even other encoders and/or decoders. When the load on the host machine becomes significant, the software processes may compete for the same resources and influence each other's processing speed. This can be problematic, particularly for a video encoder that is expected to deliver output at regular time intervals. Although buffering may solve some of these issues, adding a buffer introduces additional delay that is in many cases undesired. Conventional solutions often comprise carefully fine tuning configuration parameters and/or overprovisioning resources (e.g., selecting one of the more high-end cloud instances) resulting in additional effort and increased financial cost. Furthermore, when over dimensioning the system for the statistical "worst case" (e.g., the maximum number of video streams the cloud service should be able to handle), there could be many occasions where the system resources are not being fully used.

G. Correa et al. ("Complexity scalability for real-time HEVC encoders," Journal of Real-Time Image Processing, pp. 1-16, 2014) propose a complexity scalability method for HEVC in which CTUs are dynamically constrained by limiting the prediction block (PB) and setting a maximum tree depth for each CTU.

Zhao et al. ("Flexible mode selection and complexity allocation in high efficiency video coding" Selected Topics in Signal Processing, IEEE Journal of, vol. 7, no. 6, pp. 1135-1144, December 2013) propose a hierarchical complexity allocation scheme for HEVC based on linear programming.

While these methods provide alternative means for obtaining complexity control, they report high variation of the encoding time over multiple GOPs (Group Of Pictures).

SUMMARY OF THE INVENTION

It is an advantage of the present invention that a fully scalable solution for complexity control is provided, for optimal use of resources and where the spread in encoding time is converging.

Any of the embodiments of the invention can be implemented in an encoder.

An aspect of the present invention is a method or system or encoder to encode video frames having coding units which can be coded with a plurality of coding modes, by, for each coding unit of the frame the method steps of:
  Determining a rate distortion cost associated with encoding the coding unit with a given coding mode, for each of a chosen or selected number of coding modes being a reduced number of zones selected from the plurality of coding modes,
  Estimating an estimated rate distortion cost error as the difference between the lowest rate distortion cost amongst the determined rate distortion costs and an estimated lowest rate distortion cost amongst the complete plurality of coding modes,
  wherein, the chosen number of coding modes is selected such that the difference between the rate distortion cost error and a target rate distortion cost error is minimised.

An example of a code is for example video compression.

Another aspect of the present invention relates to a method or system or encoder for adaptive use of image frame processing resources comprising defining a rate distortion cost error threshold or target associated with received image frames, determining a difference between a complexity associated with the rate distortion cost error threshold or target and a threshold or target complexity, and updating the rate distortion cost error threshold or target to reduce this difference. Preferably, process of reducing the difference should not involve a significant increase in the use of resources.

In the above methods or systems or encoders the use of resources may exceed or not exceed a target value. If more resources are used than the target value then other processes can be impaired. If less resources are used, then the quality of displayed video frames can be reduced. Accordingly, continuous adaption to changing parameters and video processing factors is preferred which results in the image frame processing resources varying dynamically in time.

In one embodiment of the present invention there is provided a system, a method or an encoder for adaptive use of image frame processing resources for video compression, the image frame processing resources varying dynamically in time, wherein the video signal comprises image frames processed at a video rate, wherein an image frame is expressed in a number of coding units, a coding unit having a predefined maximum size, the method comprising the steps: recursively splitting coding units into a quad-tree structure of different coding units having levels and sublevels, wherein in a quad-tree structure, each level or sublevel is recursively split into parts, a depth of a specific coding unit being defined by the number of recursive splits of coding units that have been used in order to reach the specific coding unit, whereby the size of the specific coding unit is the maximum size divided by the number of recursive splits, a coding unit at a certain depth being encodable with a first number of different coding modes. The rate distortion cost for a second number of coding modes is determined, the second number being less or equal to the first number of different coding modes for the specific coding unit, the determining of the second number being such as to maximise the use of dynamically for the encoder available image frame processing resources, the difference between the rate distortion cost for the first and the rate distortion cost for the second number of coding modes is the rate distortion cost error, and the difference between the rate distortion cost error and a targeted rate distortion cost error has a minimum value for a certain coding mode, said coding mode is selected to encode the coding unit.

Alternatively a difference between an estimated rate distortion cost for the first number of coding modes and a determined rate distortion for the second number of coding modes is an estimated rate distortion cost error, and the difference between the estimated rate distortion cost error and a targeted rate distortion cost error has a minimum value for a certain coding mode, wherein said coding mode is selected to encode the coding unit.

The systems, encoders and methods described above provide means for maximizing the use of an available complexity budget (which refers, for example to a budget for vide frame processing resources) when performing video compression, while controlling the rate distortion cost.

A further useful step of embodiments of the present invention is to be able to normalize by dividing any of the processing factors with the number of pixels in the level to be calculated.

For example, the system, method or encoder can comprise use of a central processing or graphics processing unit to normalize the collection of pixels of the coding unit at level m and with index m, by dividing said coding unit with the number of pixels at the level m.

By normalizing the procedure, the system, encoder or method becomes independent of coding level.

An advantage of the present invention is to be able to keep inside or close to a complexity budget per frame or to approach dynamically the complexity budget per frame. For example, the system, encoder or method can comprise, for each frame, the central processing or graphics processing unit providing a controller for adapting the threshold or target of the rate distortion cost error, based on the difference between the reduced complexity and the value of the complexity target in a or the previous frame stored in a memory.

By having a complexity budget per frame, distortions can be smeared out over each frame.

An advantage of the present invention is to be able to calculate in elapsed CPU OR GPU time. For example, the system, encoder or method can comprise the central processing or graphics processing unit having the controller calculating the complexity for a frame in elapsed central processing or graphics processing unit processing time for encoding the whole frame.

Accordingly, a practical measure of complexity can be to use the elapsed CPU OR GPU processing time. If too many resources are being used then this can appear as an increased CPU OR GPU processing time. If too few resources are being used then this can appear as a decreased CPU OR GPU processing time.

An advantage of the present invention is to assume that the values of $\alpha_m$ are independent of each other. For example, the system, encoder or method can comprising the central or graphics processing unit treating the actual number of coding modes for per coding unit being independent of each other.

In this way the system, encoder or method can be simplified by assuming that the coefficients $\alpha_m$ (which is the actual number of coding modes evaluated for a coding unit at level m) are independent from each other. This simplification makes the calculations easier but can result in errors. Accordingly, it is preferred if methods of adaptive correction according to embodiments of the present invention are used to dynamically adjust the video frame processing.

An advantage of the present invention is to be able to estimate $I_{m,N}$ (which is a rate distortion cost for all modes N). For example, the system, encoder or method can comprise the central processing or graphics processing unit estimating the rate distortion cost comprising all coding modes by assuming said cost is proportional to a linear model of the rate distortion cost comprising less than all coding modes. By estimating using a model the calculation of rate distortion costs for all coding modes is avoided.

Since the optimal rate distortion (RD) cost $I_{m,N}$ (for all modes N) is not known for $I_{m,n}$ where n<N, (i.e. when the rate distortion cost is not calculated for all coding modes N) it can be estimated, for example to be proportional to $I_{m,n}$.

For example, the system, encoder or method can comprise that an estimated rate distortion cost is linearly proportional to the rate distortion cost comprising all coding modes multiplied by the coefficient 0.87, 0.92, 0.94, 0.95 for the depth 0, 1, 2 and 3 respectively.

The inventors have found that the above mentioned coefficients provide a good estimate.

An advantage of the present invention is to be able to estimate only two groups of modes instead of many modes. For example, the system, encoder or method can comprise the central processing or graphics processing unit evaluating two groups of modes, the first group comprising the 2N×2N merge mode and the second mode comprising all other modes. Accordingly, the system, encoder or method can be simplified by assuming that there are two groups of coding modes.

An advantage of the present invention is to be able to program a controller. For example, the system, encoder or method can comprise the central processing unit or graphics processing unit implementing the controller based on a root-finding method. There are two types of root finding, namely bracketed and open methods. Both bracketed and open methods can be used with embodiments of the present invention. Different methods will have different performance characteristic, for example bracketed methods will converge but may take time to do so. Open methods may be quicker but do not necessarily always have a guarantee of convergence.

Examples of root finding methods such as a bisection method, a false position method, the Brent Dekker method, Muller's method, Simple fixed point iteration method, Newton's method, multidimensional Newton's method, secant method or similar.

A controller can be implemented to try out various modes for each coding unit; whereby the controller can be based on a root finding method such as the root-finding bisection method or one of the other methods mentioned above.

For example, the system, encoder or method can comprise the central or graphics processing unit instructing the controller to execute a root finding method of those mentioned above such as a bisection method with the following steps:

Set initial value to the step size, assign a variable "equal_sign" to True

If A and B can each be true or false, and A is the condition that the step size is larger than or equal to zero, and B is the condition that the reduced complexity is larger than or equal to the complexity threshold, and A is different from B, then Reduce the step size to half and change direction Set variable "equal_sign" to false If A is equal to B and variable "equal_sign" is true, then double the step size without changing direction, Set variable "equal_sign" to false, and let the rate distortion cost error be increased by one step size unless this is smaller than zero, then let the rate distortion cost error target be zero.

This may be written as pseudocode (FIG. 3):

```
σ ← σ₀
equal_sign ← True
function UPDATETHRESHOLD(C_T, C_R)
    if (σ ≥ 0 ) ≠ (C_R ≥ C_T) then
        σ ← σ / −2
        equal_sign ← False
    else
        if equal_sign then
            σ ← 2σ
        end if
        equal_sign ← True
    end if
    E_T ← max(0, E_T + σ)
end function
```

This can be understood as
1. Assign the step size sigma to an initial value, sigma zero.
2. Assign the variable "equal_sign" to True. (Can also be assigned to False, it may just change the number of iterations).
3. The function UPDATE . . . is just a notation/name for the rest of the code.
4. A first condition A is that the step size is larger or equal to zero. A condition B is that the reduced complexity CR should be larger or equal to the complexity threshold CT. If A is not equal to B, e.g (A,B) is (True,False) or (False,True) then
5. Assign the step size sigma to sigma divided by −2, thus reducing the step size to half and changing direction.
6. Assign "equal_sign" to False
7. Else: if the condition in 4 is not fulfilled
8. And if "equal_sign" is True
9. Then double the step size sigma (in the same direction)
10. Endif for line 8
11. Assign "equal_sign" to False (in any case)
12. Endif of line 4
13. Assign RD cost error target ET to (the RD cost error target ET+step size sigma) or zero, in case the (the RD cost error target ET+step size sigma) is less than zero
14. End of whole function.

The controller can be implemented with the above root-finding bisection method or another root finding method like the ones described above. The bisection method involves a low complexity and allows the methods, encoders and systems according to embodiments of the present invention to adapt dynamically and continuously.

In another embodiment there is provided a system, an encoder or a controller, or a method for adaptive use of image frame processing resources comprising a central processing or graphics processing unit connected to at least one memory, the central processing or graphics processing unit being configured to receive frames of a video signal, the central processing or graphics processing unit defining a rate distortion cost error threshold or target, the difference between the corresponding first complexity achieved with the use of the rate distortion cost error threshold or target and a first complexity threshold or target is stored in the memory as a reference for the calculation of an updated rate distortion cost error threshold or target, wherein the difference between a second complexity achieved with the updated rate distortion cost error threshold or target, and the former first complexity threshold or target is smaller or equal to the difference between the former first complexity and the first complexity threshold or target. This results in the same difference compared to the complexity threshold or target or a better performance.

In another embodiment there is provided a system, an encoder or a controller, or a method for adaptive use of image frame processing resources comprising a central processing or graphics processing unit connected to at least one memory, the central processing or graphics processing unit being configured to receive frames of a video signal, each frame being split into coding units comprising pixels, the central processing or graphics processing unit defining a rate distortion cost error threshold, the difference between the corresponding complexity and a complexity threshold is stored in the memory as a reference for the calculation of an updated rate distortion cost error threshold, wherein the difference between the complexity resulting from the updated rate distortion cost error threshold, and the former complexity threshold is smaller or equal to the difference between the former complexity and the complexity threshold.

The system, encoder or controller provides means or a method step for maximizing the use of an available complexity budget when performing video compression, while controlling the rate distortion cost.

For example, the system, encoder, controller or method can comprise a coding unit at level m with an index m being normalised by instructing the central processing or graphics processing unit to divide it with the number of pixels at the level m. The controller can be adapted to perform the above mentioned normalization.

The normalization has the advantage of making the system, encoder, controller or method independent of coding level.

An advantage of the present invention is that the system, encoder or controller or method keeps within the complexity budget per frame. For example, the system, encoder controller or method can comprise for each frame, the threshold or target of the rate distortion cost error being adapted by the central processing or graphics processing unit, based on the difference between a desired reduced complexity and the complexity target in the previous frame.

The controller can be adapted to perform the above mentioned adaptation.

By having a complexity budget per frame, distortions can be smeared out over each frame.

An advantage of the present invention is to be able to calculate in elapsed CPU OR GPU time. For example, the system, encoder, controller or method can provide that the complexity for a frame is expressed in elapsed central processing or graphics processing unit processing time for encoding the whole frame. The controller can be adapted to perform the above mentioned expression.

A practical measure of complexity can be to use the elapsed CPU OR GPU time.

An advantage of the present invention is to be able to assume that the values of $\alpha\_m$ (see above) are independent of each other. For example, the system, encoder, or method can comprise the central processing or graphics processing unit being instructed to consider the actual number of coding modes per coding unit as being independent of each other. The controller can be adapted to implement the above mentioned independency.

The system, encoder controller or method can be simplified by assuming that the coefficients $\alpha_m$ are independent.

An advantage of the present invention is to be able to estimating the I_(m,N) (see above). For example, the system, encoder, controller or method can provide that the rate distortion cost (comprising all coding modes) is estimated by the central processing or graphics processing unit to be proportional to a linear model of the rate distortion cost comprising less than all coding modes. The controller can be adapted to perform the above mentioned estimation.

Since the optimal RD cost I_(m,N) (for all modes N) is not known for I_(m,n) where n<N, it can be estimated, for example to be proportional to I_(m,n).

An advantage of the present invention is to be able to rely on linear dependency. For example, the system, encoder or method can provide that the central processing or graphics processing unit is instructed to consider an estimated rate distortion cost being linearly proportional to the rate distortion cost comprising all coding modes, multiplied by the coefficient 0.87, 0.92, 0.94, 0.95 for the depth 0, 1, 2 and 3 respectively.

The inventors have found that the above mentioned coefficients provide a good estimate.

An advantage of the present invention is to be able to estimate only two groups of modes instead of many modes. For example, the system, encoder, controller or method can comprise that only two groups of modes are evaluated by the central processing or graphics processing unit, the first group comprising the 2N×2N merge mode and the second mode comprising all other modes. The controller can be adapted to perform the above mentioned evaluation.

The system, encoder, controller or method can be simplified by assuming that there are two groups of coding modes.

In another aspect the present invention provides a controller for adaptive use of image frame processing resources, the controller comprising a central processing unit connected to at least one memory, the central processing unit being configured to receive frames of a video signal, each frame being split into coding units comprising pixels, the central processing unit defining a first rate distortion cost error threshold or target, the difference between the corresponding complexity achieved with the first rate distortion cost error threshold or target and a first complexity threshold is stored in the memory as a reference for the calculation of an updated rate distortion cost error threshold or target, wherein the difference between a second complexity resulting from use of the updated rate distortion cost error threshold, and the former first complexity threshold or target is smaller or equal to the difference between the former first complexity and the first complexity threshold or target.

BRIEF DESCRIPTION OF THE DRAWINGS

FIG. 3 show an embodiment of the present invention comprising a pseudo code of the proposed complexity controller

DEFINITIONS

Figure 1:
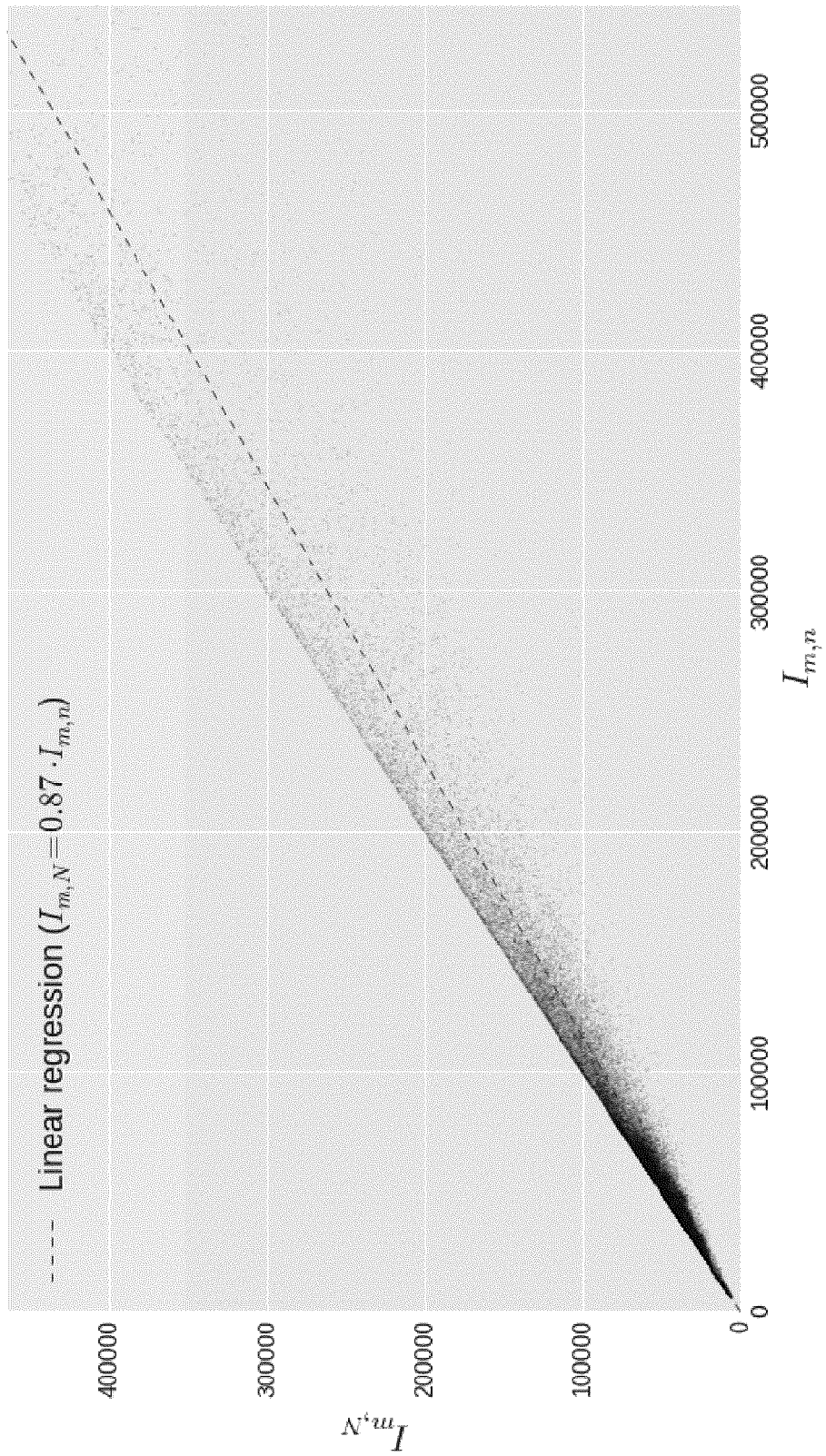
FIG. 1 shows an embodiment of the present invention comprising a scatter plot of measurements of $I_{m,n}$ and $I_{m,N}$.

An "image frame" or "video frame" or just "frame" can be an individual image. A sequence of such frames e.g. images shown during certain duration of time, can provide the appearance of motion. A frame can comprise a collection of pixels.

A frame can be divided into "blocks" or "Coding Tree Units" (CTUs). CTUs can be recursively sub-divided into smaller "Coding Units" (CUs).

A "Prediction Unit" (PU) can be a collection of pixels for which a prediction can be generated.

A "Transform Unit" (TU) can be a collection of pixels for which a transformation can be applied, e.g. cosine, sine, Fourier.

The "Lagrange multiplier" or "Lagrangian" is factor that can be used in a mathematical method to solve optimization problems.

A "Motion Vector" (MV) is a vector that can be used to signal a block or unit in an image frame based on the position of this block or unit (or a similar one) in another image frame, called the reference (image) frame.

A "SKIP" or "merge SKIP" can be used in HEVC resulting in that no residue is transmitted as codec.

"Complexity" can be used as a measure for the amount of occupied resources. A resource refers to a digital processing resource especially a video frame digital processing resource such as provided by a processing engine and memory. Examples of a processing engine are a microprocessor, an FPGA, an ASIC, a graphics card, a GPU or a CPU. For example, the time take for a processing engine such as a CPU or a GPU to execute a process can be used as an indication of the amount of resources used.

A "coding mode" can be a method used to provide the coded version of a group of pixels, e.g. a block or a unit.

"Quantization Parameter", QP, controls the trade-off between bit rate and quality.

A "target" or "target value or range" or a "threshold value" can be defined more generally as a "performance indicator". A target value is a value that ideally is to be reached. Actually achieved results may go above or below a target value. A threshold value sets a limit for a desired performance. Actually achieved results are poor when the threshold is not achieved and are generally good when the threshold value has been achieved. A target value may be defined by upper and lower threshold values i.e. the meaning of target includes a target range, whereby being inside the range, i.e. between the threshold values means that a satisfactory result has been achieved. Providing target values with upper and lower thresholds can reduce the jitter created by dynamic adaption algorithms being activated when the difference between the target value and the achieved value is small. Hence, thresholding and targets or target ranges are related performance indicators and in the description and claims threshold and target are similar, e.g. interchangeable depending on design choice.

DETAILED DESCRIPTION OF THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof.

Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Elements or parts of the described devices may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

In the video compression standard "High Efficiency Video Codec" (HEVC, also referred to as h.265) an image frame can be expressed in a number of "coding tree units", CTUs, where the maximum size of a CTU can be set to a number of pixels, the maximum size of a CTU can be set to 64×64 pixels. A CTU can be recursively split into a quad-tree structure of different "coding units" (CUs). In a quad-tree structure, each sub-level can recursively be split into a number of parts such as four parts. The depth of a CU is defined by the number of recursive splits of its CTU that have to be performed in order to reach it. For example, a CU with depth zero (0) is not split and has a maximum size such as 64×64 pixels and a CU with depth three (3) is split three times and has the size such as 8×8 pixels (which is, for example, the minimum size according to the HEVC standard). To find the optimal encoding mode for a CTU, a cost of different modes such as the Lagrangian cost of different modes can be recursively evaluated and compared.

In video compression, one way of reducing the amount of data to be handled is to use prediction. Motion vectors are used in inter-frame prediction, i.e. between frames of different points in time. A "Motion Vector" (MV) is a vector that can be used to signal (e.g. provide metadata for) a block or unit in an image frame based on the position of this block or unit (or a similar one) in another image frame, called the reference (image) frame. The methods "2N×2N merge mode" and "Advanced Motion Vector Prediction" (AMVP) can be defined to signal motion vectors (MV), e.g., to provide metadata on the blocks or units to the decoder Defining a Complexity Budget, Target or Threshold If a digital process is working on data and additional resources suddenly become available, it could be beneficial if the digital process could access these resources to e.g. to obtain improved quality. For example, in cases where the load on the host computer could change dynamically, and/or the same software is expected to run flexibly on multiple hardware platforms (e.g., cloud instances of different providers), it could be of advantage if the digital processes have an adaptive behaviour.

In one embodiment of the present invention there can be a complexity budget or target assigned to each digital process. There can be means provided for having a or each process dynamically reconfiguring itself to respect this budget, for example by using as much of the budget as possible, without exceeding it but preferably at the same time not using considerably less of the budget which could result in poorer quality displayed video.

Consider a frame being divided into M CUs so that for each CTU there can be maximum of $1+2^2+2^4+2^8$ CUs. A particular CU at index or level m, $m \in \{1, \ldots, M\}$ can be encoded using n different coding modes (or methods), $n \in \{1, \ldots, N\}$. N may be different at different CU depths and/or CU locations. CUs at a larger depth (the larger depth meaning further in the sub-branches) will only be evaluated if the parent of the CU evaluates a need to split further. If this is the case, the CU is added to the list of evaluated CUs, said list having a length $\Omega$. For the n'th mode with distortion $D_{m,n}$ (related to loss of image quality) and rate $R_{m,n}$ (related to the amount of data needed), a rate distortion costs such as a Lagrangian "rate distortion cost" $J_{m,n}$ can be defined as:

$$J_{m,n} = D_{m,n} + \lambda R_{m,n} \quad (1)$$

where $\lambda$ is the Lagrange multiplier. In general, the rate distortion cost can be defined with other means than the Lagrange multiplier. In a typical encoder, only the coding mode with the lowest rate distortion cost will actually be used for encoding. If $I_{m,n}$ is the optimal RD cost for a CU at index m after evaluating n modes:

$$I_{m,n} = \min(J_{m,1}, \ldots, J_{m,n}) \quad (2)$$

the computational complexity required for evaluating mode n for a given CU with index m will be denoted $C_{m,n}$. When evaluating all CU configurations and coding modes, the total frame complexity is given by $\Sigma_{m=1}^{\Omega} \Sigma_{n=1}^{N} C_{m,n}$.

Defining and Simplifying the Optimization Problem

In one embodiment, the complexity is reduced by not evaluating all encoding modes n per level m. Let $\alpha_m$ be the actual number of encoding modes evaluated for a CU at index m ($\alpha_m \in \{1, \ldots, N\}$) Note that the value of $\alpha_m$ can have an influence on the list of evaluated CUs and therefore can change $\Omega$.

Clearly, when only a limited set of encoding modes is evaluated (i.e., with $\alpha_m < N$) there is a possible penalty in terms of RD cost. This penalty will be called the RD cost error $E_{m,\alpha_m}$:

$$E_{m,\alpha_m} = I_{m,\alpha_m} - I_{m,N} \quad (3)$$

The RD cost error can be zero if the optimal encoding mode is found within the first encoding modes, otherwise $E_{m,\alpha_m}$ will be positive. The $\alpha_m$s can be defined so that rate and distortion are optimized while the reduced complexity f (per frame) does not exceed a particular complexity threshold or target $C_T$. In other words:

$$C_R = \sum_{m=1}^{\Omega} \sum_{n=1}^{\alpha_m} C_{m,n} \quad (4)$$

$$\min_{\alpha_0, \ldots, \alpha_\Omega} \sum_{m=1}^{\Omega} E_{m,\alpha_m} \text{ subject to: } C_R \leq C_T \quad (5)$$

Solving this constrained optimization problem is complex, particularly since the RD cost (and therefore also $I_{m,\alpha_m}$ and $E_{m,\alpha_m}$) in general depends on decisions taken in the context of previously coded CUs. If the number of encoding modes to evaluate has been severely restricted for a particular CU, the RD performance for that CU could be relatively low, which increases the RD cost for spatially and temporally neighbouring CUs trying to exploit correlation with this CU.

In one embodiment of the present invention the optimization problem can be simplified with certain assumptions. The first assumption is that the value of $\alpha_m$ for a CU can be decided independently from other CUs. In other words, it can be assumed that the $\alpha_m$s are independent from each other as well as the resulting $E_{m,\alpha_m}$s. A second assumption is that distributing the RD cost error $E_{m,\alpha_m}$ equally over the CUs results in improved human visual perception. So to cope with different CU depths, the RD cost error can be normalized per level, for example by dividing it with the number of pixels at the specific level. $\overline{E}_T$ can then denote the cost error threshold or target per pixel and $\overline{E}_{m,\alpha_m}$ can denote the cost error per pixel. Then Eq. (5) can be reformulated as:

$$\min_{\alpha_0,\ldots,\alpha_\Omega} \sum_{m=1}^{\Omega} |\overline{E}_T - \overline{E}_{m,\alpha_m}| \text{ subject to: } C_R \leq C_T \qquad (6)$$

Note that the expression in (6) is fully parameterized and can be used for any CU in the frame.

Based on equation (6) a complexity system, encoder, controller or method can be implemented where the targeted error cost or threshold error cost $\overline{E}_T$ can be varied frame-by-frame, striving to match the complexity target $C_T$, i.e. to bring $C_R$ as close as possible (or equal to) $C_T$ but without exceeding it.

Exemplary Embodiments

Now follows some exemplary embodiments of the present invention. In one embodiment, the number of encoding modes can be assumed to be simplified to two groups (instead of the complete number of N modes) for illustration purposes. However, this should not be construed as a limitation of the invention as such. The two groups used can be respectively the 2N×2N merge mode and another group containing all other encoding modes.

Deciding when to Stop Encoding

A system, encoder, controller, encoder or method can estimate $\overline{E}_{m,\alpha_m}$ to decide whether or not to continue evaluating other modes, where $\overline{E}_{m,\alpha_m}$ is a normalized version of Eq. (3). While $I_{m,n}$ is available at mode n, $I_{m,N}$ is not available and therefore needs to be estimated. FIG. 1 illustrates the relationship between $I_{m,n}$ and $I_{m,N}$ for depth or level 0 after a 2N×2N merge mode. Due to efficient construction of the merge candidate list, there is a high probability that 2N×2N merge mode is the optimal encoding mode or has low RD cost difference with the optimal mode. So, high correlation is expected. Therefore, in one embodiment, a simple linear model can be used to predict $I_{m,N}$. The coefficients of the linear model for depth {0, 1, 2, 3} can be respectively {0.87, 0.92, 0.94, 0.95}. A higher coefficient indicates that on average a lower $\overline{E}_{m,\alpha_m}$ is expected if further evaluation of encoding modes is not done.

Designing the Complexity Controller

Figure 2:
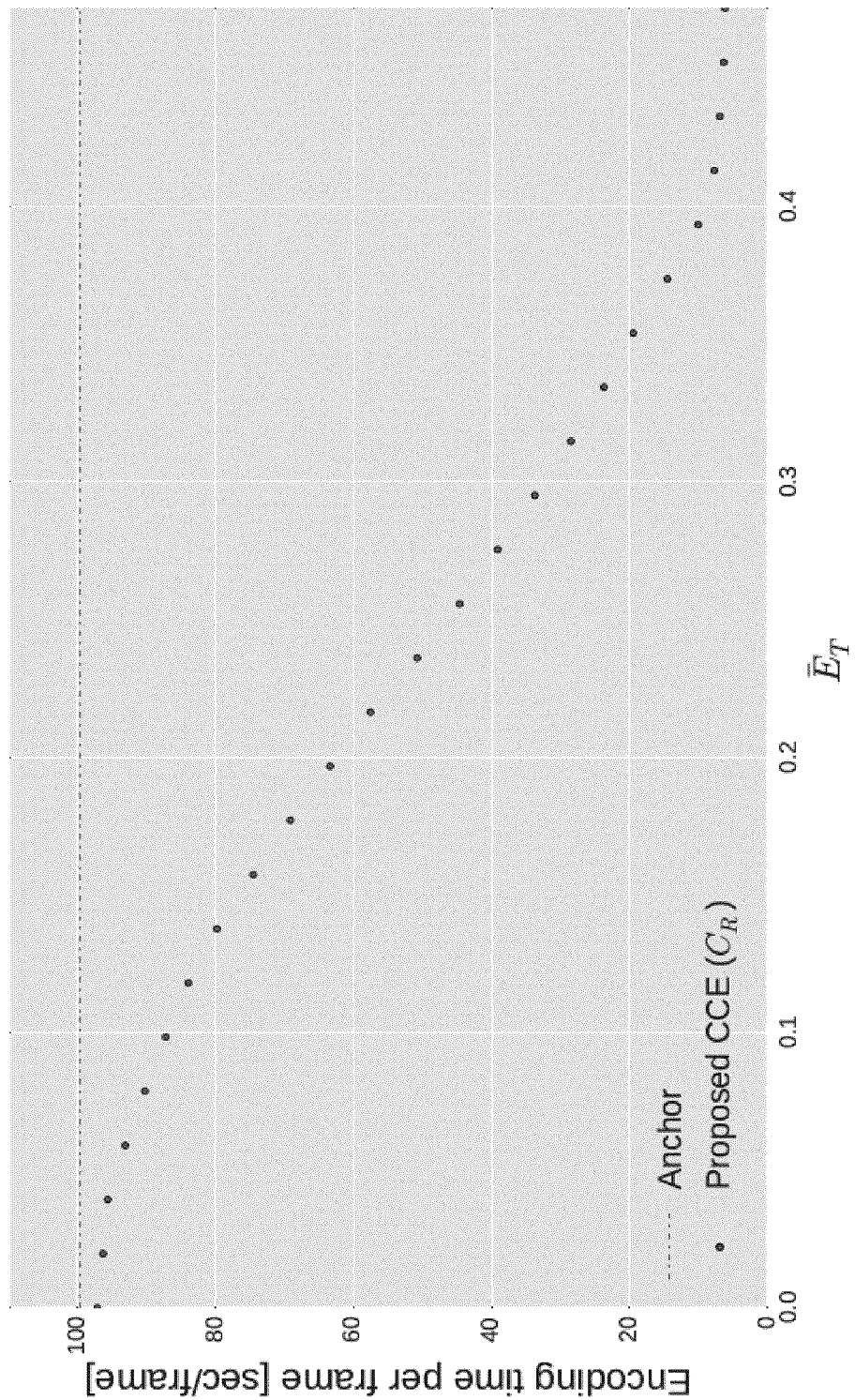
FIG. 2 shows an embodiment of the present invention comprising a Reduced encoding time $C_R$ per frame.

Embodiments of the present invention include a complexity controller which can be implemented as a standalone device, or embedded for example in a system or encoder. The goal of the complexity controller can comprise the respect of the complexity target $C_T$. FIG. 2 shows a relation between $C_R$ and $\overline{E}_T$. An anchor (or reference) encoder can be used to extract $I_{m,\alpha_m}$ and the encoding is re-run with multiple targets or thresholds $\overline{E}_T$. When $\overline{E}_T=0$ (i.e. no RD cost error in the frame), the complexity is reduced only on the CUs where the 2N×2N merge mode was the optimal mode. When $\overline{E}_T \geq 0$ different CUs will stop encoding after mode $\alpha_m$ when $I_{m,\alpha_m}$ is below the normalized threshold or target. The complexity reaches a minimum when all CUs (at depth 0) only evaluate the 2N×2N merge mode, whereby further increas-ing of the threshold or target will not decrease the complexity anymore. With a prediction model, $\overline{E}_T$ can be empirically defined for a constrained complexity $C_T$. But, this model or relation is not available for the complexity controller in a real-time implementation.

However, $C_R$ and $\overline{E}_T$ are respectively an increasing and a decreasing monotonic function of $\alpha_m$ (see Eq. 5). So, increasing the number of evaluated encoding modes $\alpha_m$ will always increase $C_R$ and decrease $\overline{E}_T$. Therefore, the complexity controller can use $\overline{E}_T$ to control the frame complexity $C_R$, due do the properties of monotonic functions. This is a typical root finding problem. However, there are additional difficulties compared to conventional root finding algorithms. In the present embodiment, while $\overline{E}_T$ is a constant for a frame, it does change slightly every frame due to various video processing factors such as the changing complexity of the video or inaccurate measurements of the encoding complexity. Therefore, a complexity controller that adapts $\overline{E}_T$ continuously on a frame-by-frame basis is required.

In a conventional root-finding problem the algorithm finds a point closer to the root at each iteration. In the present embodiment, only a single iteration can be used each frame and the algorithm can fine-tune this value on the next frame. Therefore, the basic complexity controller here presented can be based on a root finding method such as the root-finding bisection method. This proposed method is explained with pseudo-code in FIG. 3. If the root is outside the current interval, a will be doubled if the previous iteration was in the same direction (i.e. a has the same sign). Doubling allows the method to search faster for the correct interval. When the interval with the root is found, it is divided by −2 so that the direction is changed. This can allow more precise approximation of the correct value while still being able adapt to local changes in the video or noise on the complexity measurement. Alternative root finding methods can be used. There are two types of root finding, namely bracketed and open methods. Both bracketed and open methods can be used with embodiments of the present invention. Different root finding methods will have different performance characteristics, for example bracketed methods will converge but may take time to do so. Open methods may be quicker but do not necessarily always have a guarantee of convergence. Examples of root finding methods included the bisection method, a false position method, the Brent Dekker method, Muller's method, Simple fixed point iteration method, Newton's method, multidimensional Newton's method, secant method etc.

Finally, $\overline{E}_T$ is incremented with the current σ value. As $\overline{E}_T=0$ indicates maximum complexity, it is not useful to accept negative values for $\overline{E}_T$. Note that σ and equal_sign can be initialized with any value (e.g. respectively $\sigma_0$ and True), this will only have influence on the iterations needed to find the correct $\overline{E}_F$ value.

Experimental Results

Figure 4A:
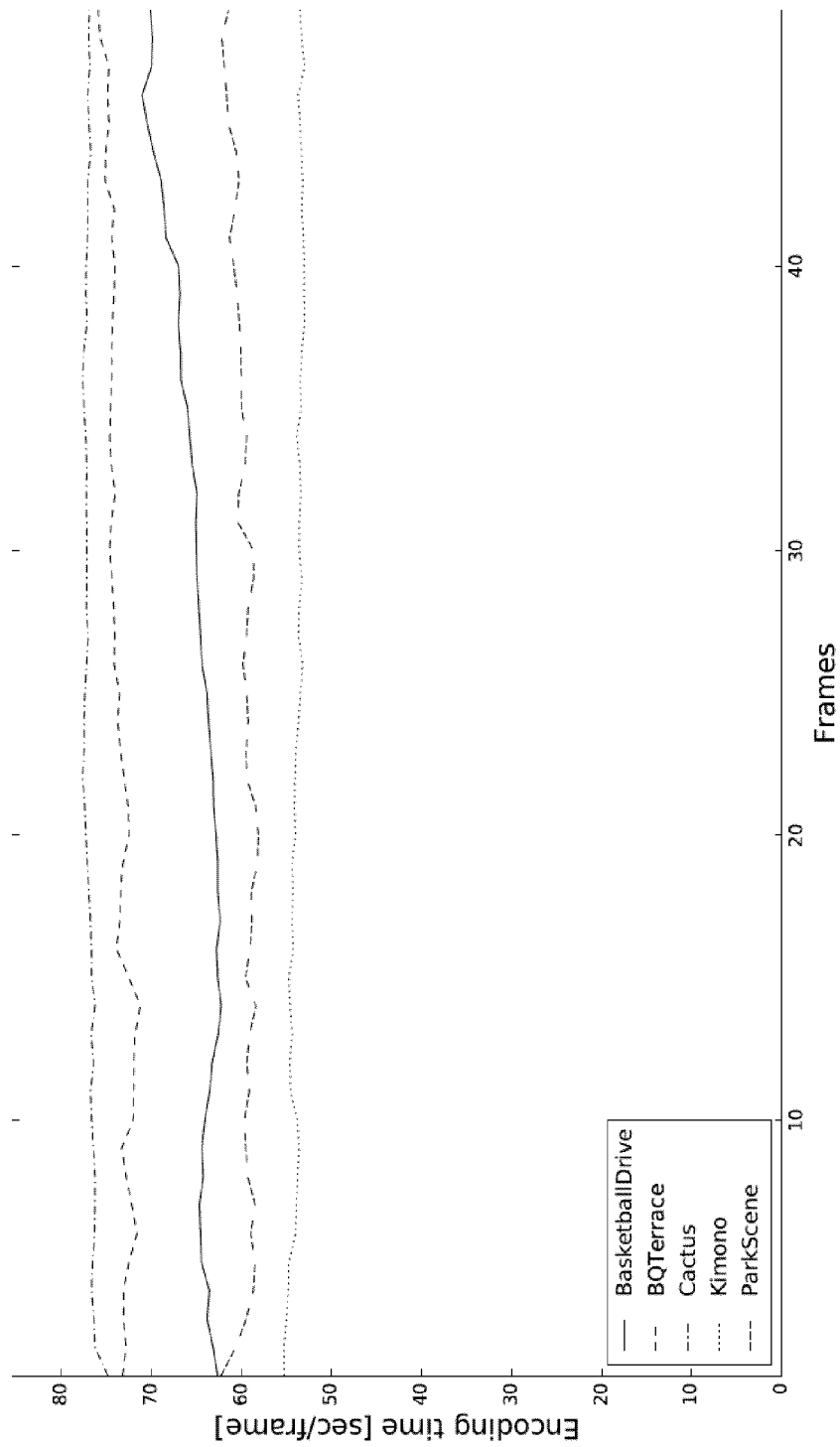
FIG. 4 shows an embodiment of the present invention comprising a Encoding time per frame for (a) the anchor encoder and (b) the complexity constrained encoder and (c) the average encoding time (ET), PSNR and bitrate.
Figure 4B:
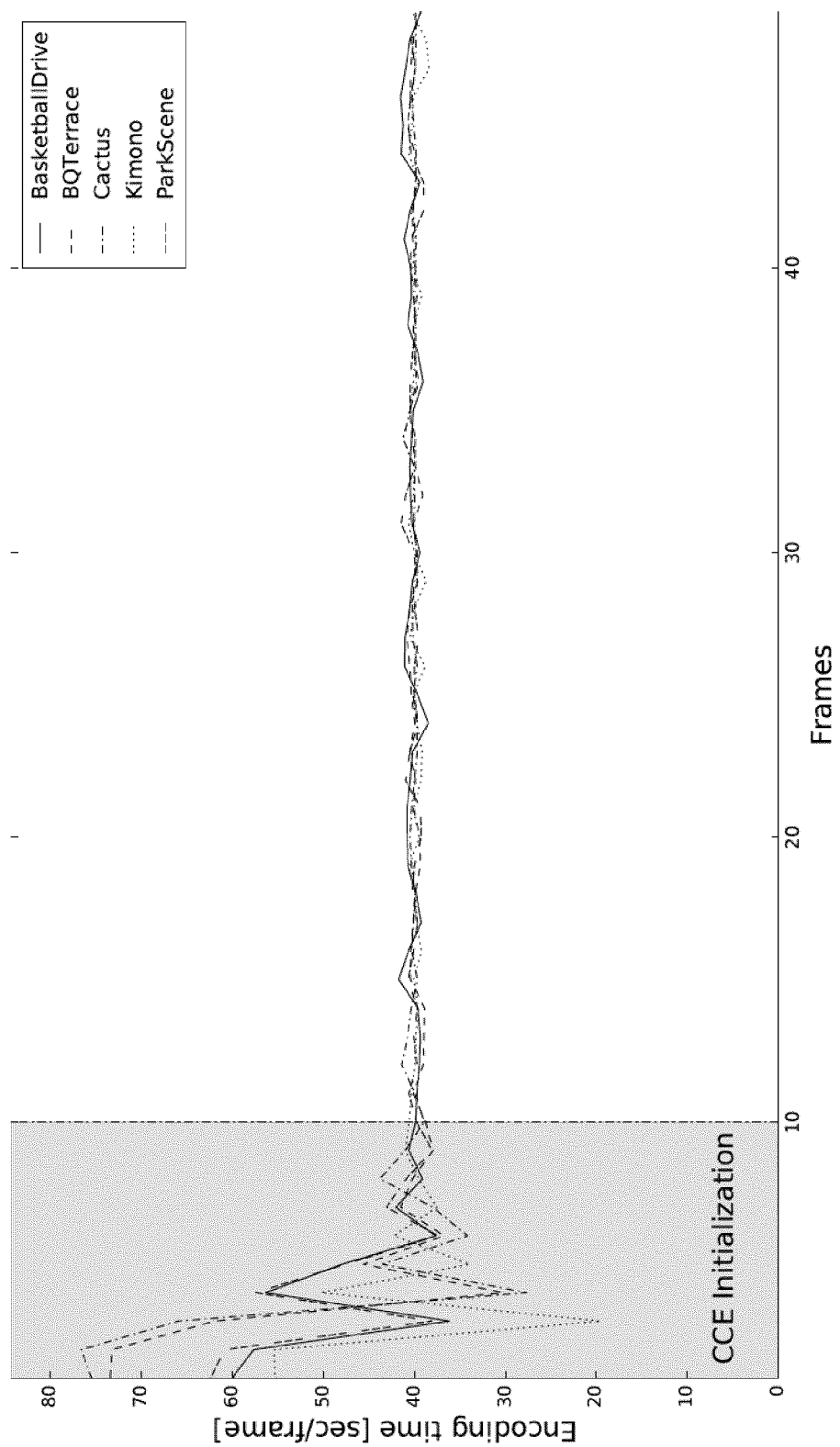

The proposed system, encoder or method can be evaluated using sequences from class B described in the common test conditions of HEVC (F. Bossen, "Doc. JCTVC-L1100: Common test conditions and software reference configurations," JCTVC, Geneva, Switzerland, Tech. Rep., January 2013), i.e. Kimono, ParkScene, Cactus, BQTerrace, BasketballDrive. The HM 16.2 reference encoder is used as the anchor or reference. There is focus on low delay settings (i.e. main tier and P slices only), with QP values 22, 27, 32, 37 and open GOP (Group Of Pictures) structure. FIG. 4 shows the encoding time per frame for QP=22, for the anchor (FIG.

4(*a*)) and the proposed method (FIG. 4(*b*)). For the anchor, although encoding settings are identical, there is a significant difference in encoding time (i.e., 42.8%) between Cactus (highest encoding time) and Kimono (lowest encoding time). The frame with the highest complexity in the BasketballDrive sequence has 14.1% more encoding time compared to the frame with the lowest complexity. For the proposed method (FIG. 4(*b*)), a complexity target of 40 seconds per frame was defined. As can be observed in the figure, the encoder initializes during the first frames in an attempt to find the RD cost threshold or target using the bisection method or another root finding method. There are two types of root finding, namely bracketed and open methods. Both bracketed and open methods can be used with embodiments of the present invention. Different root finding methods will have different performance characteristics, for example bracketed methods will converge but may take time to do so. Open methods may be quicker but do not necessarily always have a guarantee of convergence. Examples of root finding methods include the bisection method, a false position method, the Brent Dekker method, Muller's method, Simple fixed point iteration method, Newton's method, multidimensional Newton's method, secant method etc.

After this initialization phase, the complexity controller adapts the threshold or target frame-by-frame, and manages to keep computational complexity close to the complexity budget, with an average deviation of 0.57 seconds (1.4%). Reduced complexity comes at a limited cost, e.g., 0.13 dB PSNR loss and 1.6% bitrate loss for a complexity reduction of 48% for the Cactus sequence.

Figure 5A:
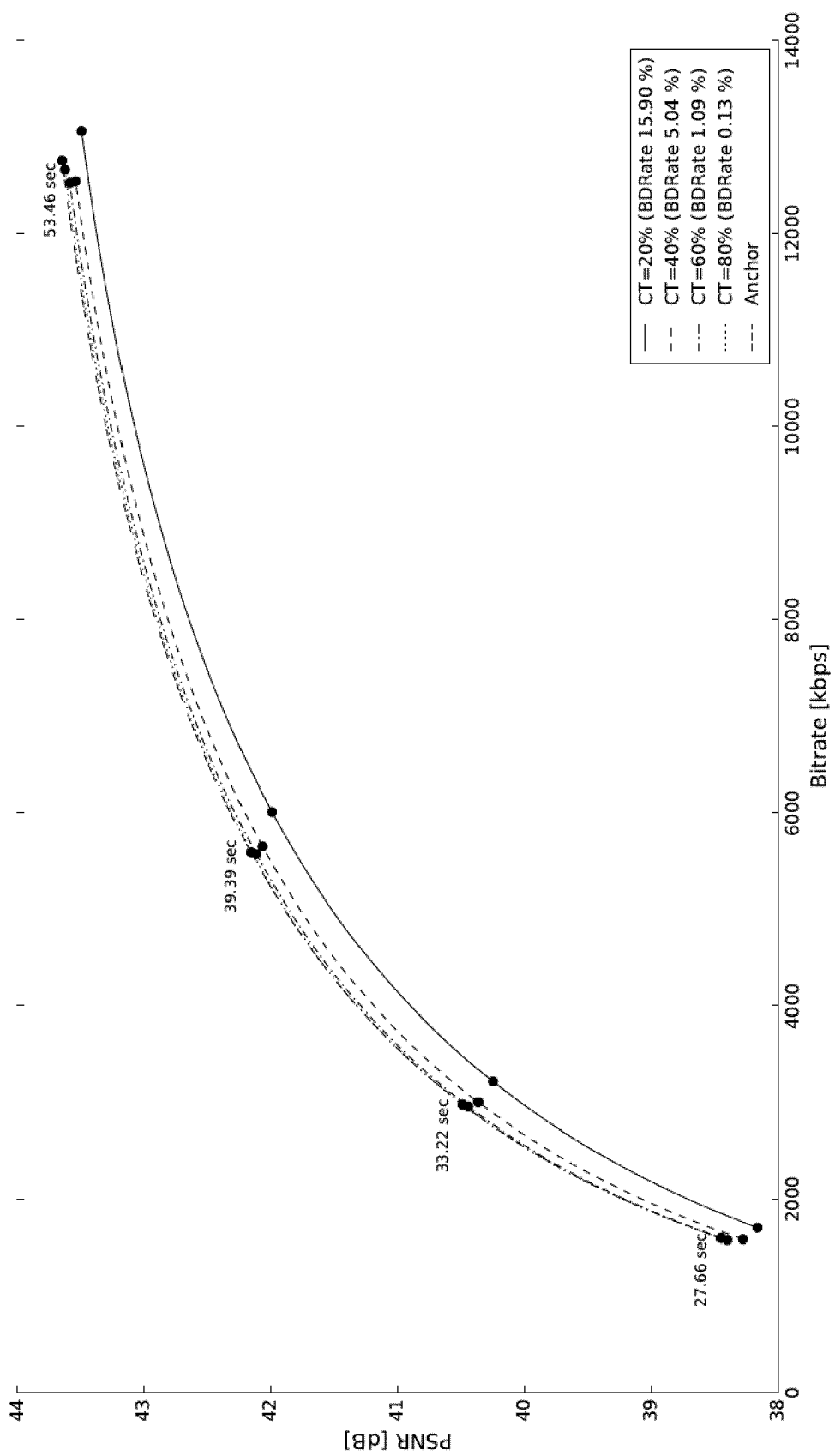
FIG. 5 shows an embodiment of the present invention comprising RD curves for different complexity thresholds (CT): (a) Kimono (b) ParkScene, (c) Comparison of encoding time (ET) and BD-rate (BDR) for different complexity thresholds.
Figure 5B:
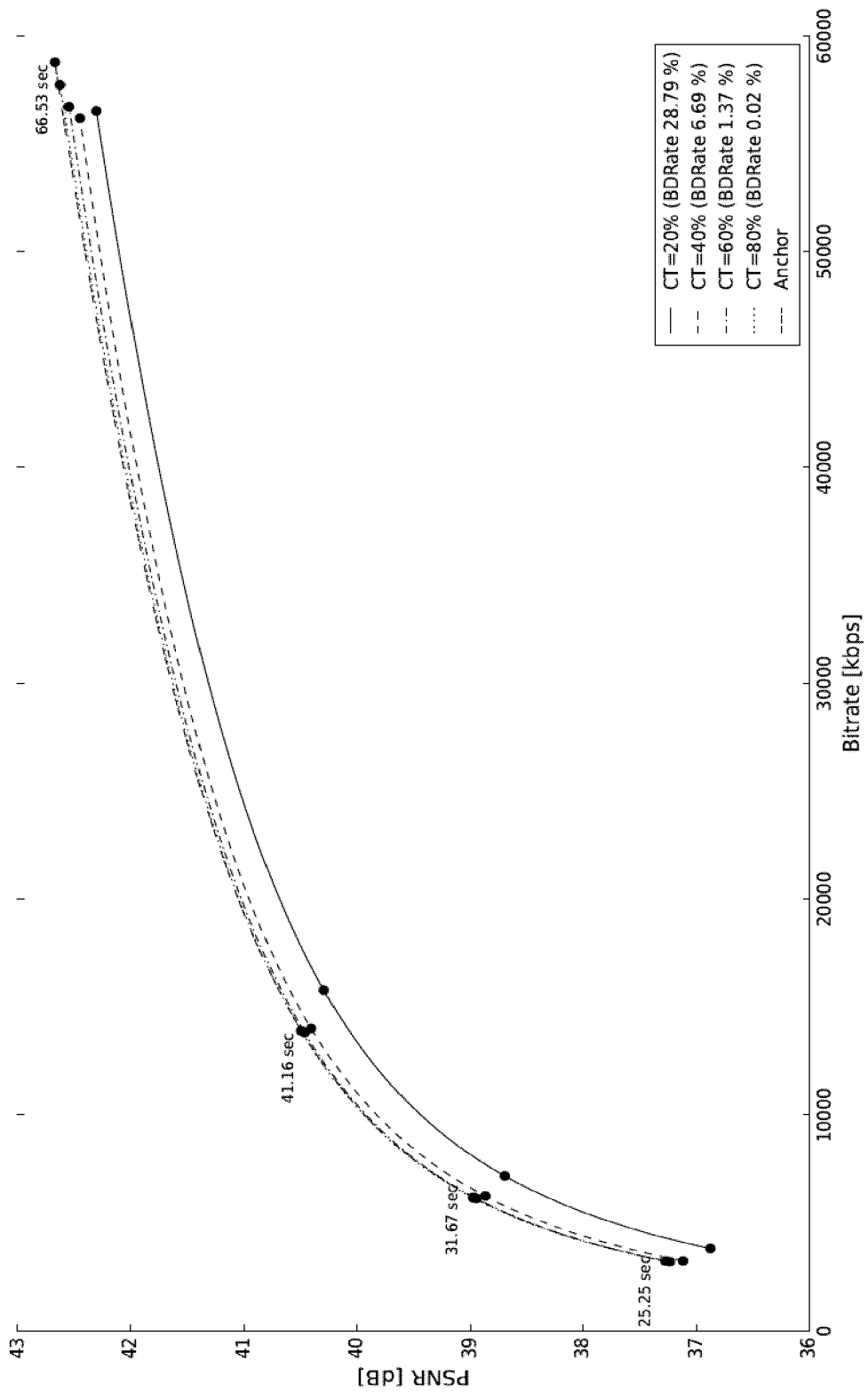

FIG. 5 shows RD curves for different complexity targets (CT), for Kimono (FIG. 5(*a*)) and ParkScene (FIG. 5(*b*)). The CT is defined relative to the anchor encoding time at same QP point (anchor encoding time for each QP are provided in the Figure). For a complexity target of 80%, the BD-rate (BD=BjØntegaard Delta Rate) increase ranges from 0:00% (for ParkScene) to 1:72% (for BqTerrace).

The proposed system, encoder or method for complexity control is compared with a number of fixed complexity methods incorporated in the HM encoder. Using early skip detection (ESD), an average complexity of 74:8% (relative to the anchor) is measured. When only a maximum CU depth of 2 (MD2) is allowed, an average encoding time of 41:8% of the anchor encoding is measured. At high complexity targets, low BD-rate loss is measured compared to the ESD method. The BD-rate loss at CT=40% is lower for the BasketBallDrive, Cactus and ParkScene sequences. Embodiments of the present invention provide complexity control, and in general have better RD performance compared to the ESD and MD2 methods. Occasionally, the latter methods show better performance, indicating that there is still room for improvement. Improvements can include, for example, improving the RD cost error prediction and/or allowing more groups of encoding modes instead of only 2N×2N merge mode.

Figure 6:
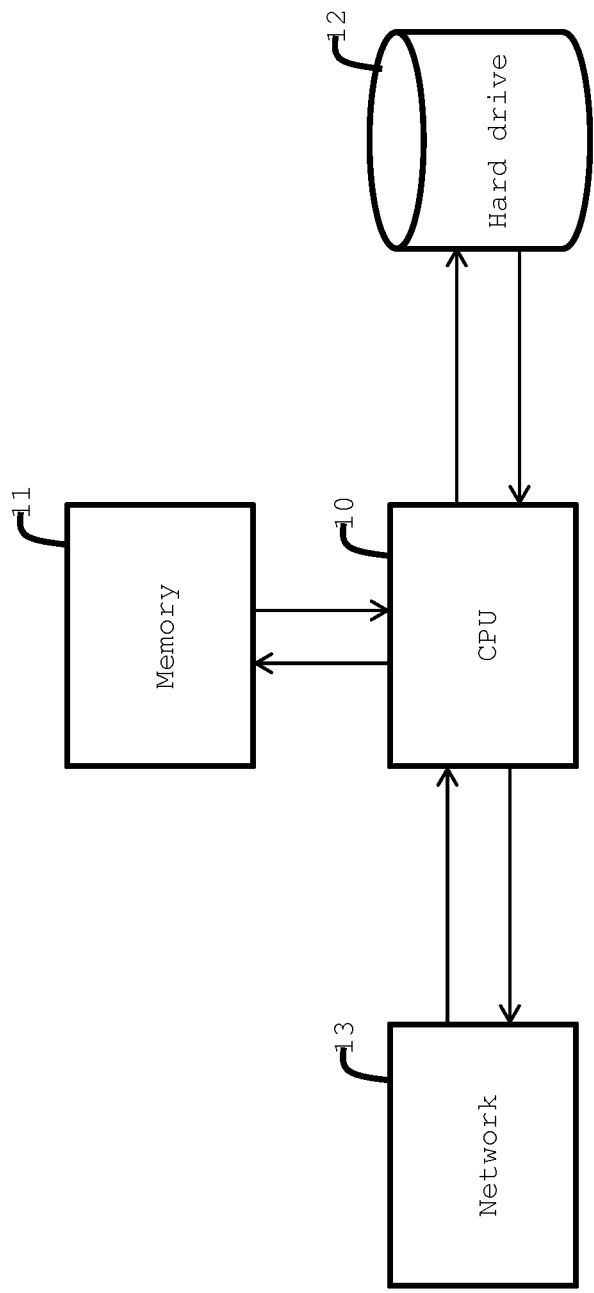
FIG. 6 shows an embodiment of the present invention for implementing a system.

FIG. 6 shows an illustration of an embodiment of the present invention. The central processing unit or graphics processing unit 10 can be connected to and communicate with a memory 11, a non-volatile memory such as a solid state memory or a hard drive 12 and a network 13, e.g. to form a system or encoder or to carry out a method for adaptive use of image frame processing resources. The system or encoder can comprise a central processing or graphics processing unit connected to at least one memory, the central processing or graphics processing unit being configured to receive frames of a video signal, each frame being split into coding units comprising pixels, the central processing or graphics unit defining a first rate distortion cost error threshold or target, the difference between the corresponding first complexity achieved with this rate distortion cost error threshold or target and a first complexity threshold or target is stored in the memory as a reference for the calculation of an updated rate distortion cost error threshold, wherein the difference between a second complexity resulting from use of the updated rate distortion cost error threshold, and the former first complexity threshold or target is smaller or equal to the difference between the former first complexity and the first complexity threshold or target.

A coding unit at level m and with index m can be normalised by instructing the central processing or graphics unit to divide it with the number of pixels at the level m.

For each frame, the threshold or target value or the rate distortion cost error can be adapted by the central processing or graphics processing unit, based on the difference between the reduced complexity and the complexity target in the previous frame.

The complexity for a frame can be expressed in elapsed central processing or graphics processing unit processing time for encoding the whole frame.

The central processing unit or graphics processing can be instructed to consider the actual number of coding modes for per coding unit as independent of each other.

The rate distortion cost comprising all coding modes can be estimated by the central processing or graphics processing unit to be proportional to a linear model of the rate distortion cost comprising less than all coding modes.

The central processing or graphics processing unit can be instructed to consider an estimated rate distortion cost as being linearly proportional to the rate distortion cost comprising all coding modes, multiplied by the coefficient 0.87, 0.92, 0.94, 0.95 for the depth 0, 1, 2 and 3 respectively.

Only two groups of modes need be evaluated by the central processing or graphics processing unit, the first group comprising the 2N×2N merge mode and the second mode comprising all other modes.

The central processing or graphics processing unit can implement a controller by means of a root-finding method such as the bisection method. Other root finding methods can be used. There are two types of root finding, namely bracketed and open methods. Both bracketed and open methods can be used with embodiments of the present invention. Different root finding methods will have different performance characteristics, for example bracketed methods will converge but may take time to do so. Open methods may be quicker but do not necessarily always have a guarantee of convergence. Examples of root finding methods such as a bisection method include a false position method, the Brent Dekker method, Muller's method, Simple fixed point iteration method, Newton's method, multidimensional Newton's method, secant method etc.

Figure 7:
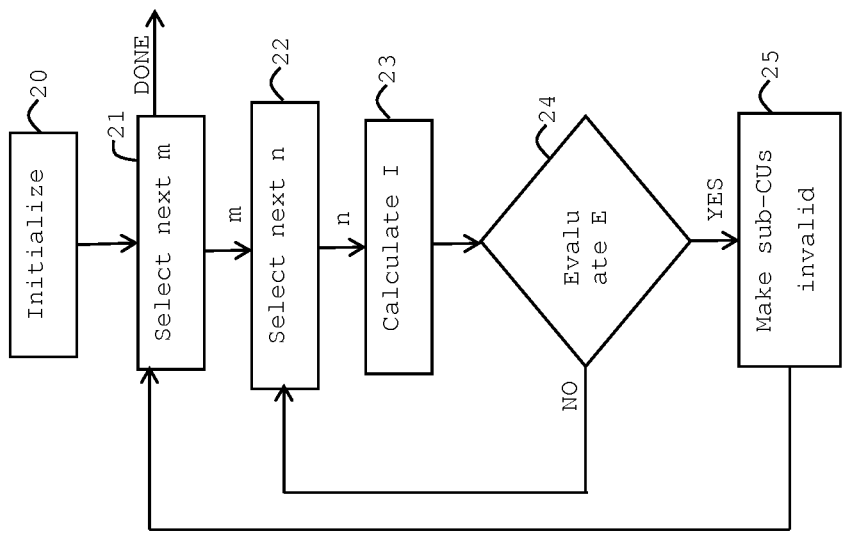
FIG. 7 shows an embodiment of the present invention comprising a flow diagram.

FIG. 7 shows a flow chart for an embodiment of the present invention. In step 20 the various parameters are being initialized (for example, the complexity CR can be set to 0) and the value can be stored in the memory 11 (alternatively for the memory 11 the hard drive 12 can be used for storage throughout this section). In step 21 the CPU or GPU 10 can select a coding unit n from a list of all possible coding units stored in the memory 11. In step 21 the CPU or GPU 10 can select a coding mode n from a list of coding modes that can be stored in the memory 11. In step 23 the rate distortion cost I can be calculated. In step 24 the CPU or GPU calculates the normalized rate distortion cost error and compares the result with a targeted normalized rate distortion cost error that can be stored in memory 11. The normalization can be made by dividing the RD cost error of CU n with the number of pixels in the CU n. If the difference between the calculated RD cost error and the referenced RD cost error (for CU m and mode n) is higher than the targeted difference, the CPU or GPU returns to step 22 to select the next coding mode and perform calculations in steps 23 and 24. If the calculated difference is lower or equal to the targeted difference, the coding mode n is selected. The CPU or GPU now returns to step 21 and selects the next CU m. When a coding mode has been chosen for to all CUs, the frame has been encoded and can be transmitted. In practice, the RD cost can be provided by the encoder. A common way to measure the complexity can be to measure the total CPU or GPU time needed to encode the full frame. If this is used, the used complexity can be compared with the budgeted complexity when the whole frame has been encoded. A controller can then be implemented to adjust the targeted RD cost error between frames in order to keep within the complexity budget or to approach it with time. Encoded images can be transmitted to a network for example.

In accordance with an embodiment of the present invention, an encoding engine is provided for encoding images from at least one input source. The encoding engine can be included in the controller for example. The encoding engine can include one or more FPGA, ASIC, or microprocessors, processors, controllers, or the central processing unit (CPU) 10 and/or a Graphics Processing Unit (GPU), and can be adapted to carry out functions by being programmed with software, i.e. one or more computer programmes.

The encoding engine may have the memory 11 (such as non-transitory computer readable medium, RAM and/or ROM), an operating system running on a microprocessor, optionally a display such as a fixed format display, data entry devices such as a keyboard, a pointer device such as a "mouse", serial or parallel ports such as I/O ports to communicate with other devices, or network cards and connections to connect to any of the networks or to peripheral devices.

In accordance with another embodiment of the present invention software may be implemented as a computer program product which has been compiled for a processing engine in the encoding engine described above, e.g. for maximizing the use of a complexity budget, wherein expression is parameterized and valid for all coding level. The computer program product may be stored on a non-transitory signal storage medium such as an optical disk (CD-ROM or DVD-ROM), a digital magnetic tape, a magnetic disk, a solid state memory such as a USB flash memory, a ROM, etc.

The encoding software can be embodied in a computer program product adapted to carry out the following functions when the software is loaded onto the respective device or devices and executed on one or more processing engines such as microprocessors, FPGA, ASIC etc:

adaptive use of image frame processing resources for video compression, the image frame processing resources varying dynamically in time, wherein the video signal comprises image frames processed at a video rate, wherein an image frame is expressed in a number of coding units, a coding unit having a predefined maximum size and a controller receiving said image frame, and/or recursively splitting coding units into a quad-tree structure of different coding units having levels and sub-levels, wherein in a quad-tree structure, each level or sub-level is recursively split into parts, a depth of a specific coding unit being defined by the number of recursive splits of coding units that have been used in order to reach the specific coding unit, whereby the size of the specific coding unit is the maximum size divided by the number of recursive splits.

The encoding software can be embodied in a computer program product adapted to carry out the following functions when the software is loaded onto the respective device or devices and executed on one or more processing engines such as microprocessors, etc:
wherein a coding unit at a certain depth is encodable with a first number of different coding modes, and
determining a rate distortion cost for a second number of coding modes, the second number being less or equal than the first number of different coding modes for the specific coding unit, the determining of the second number being such as to maximise the use of dynamically for the encoder available image frame processing resources, and
the difference between the estimated rate distortion cost for the first and the determined rate distortion cost for the second number of coding modes is the rate distortion cost error, and the difference between the rate distortion cost error and a targeted rate distortion cost error has a minimum value for a certain coding mode, said coding mode is selected to encode the coding unit.

The encoding software can be embodied in a computer program product adapted to carry out the following functions when the software is loaded onto the respective device or devices and executed on one or more processing engines such as microprocessors, FPGA, ASIC etc.:
normalizing the collection of pixels of the coding unit at level m and with index m, by dividing said coding unit with the number of pixels at the level m, and/or
for each frame, the central processing or graphics processing unit having the controller adapting the threshold of the rate distortion cost error, based on the difference between the reduced complexity and the value of the complexity target in the previous frame stored in the memory.

The encoding software can be embodied in a computer program product adapted to carry out the following functions when the software is loaded onto the respective device or devices and executed on one or more processing engines such as microprocessors, FPGA, ASIC etc.
calculating the complexity for a frame in elapsed central processing or graphics processing unit processing time for encoding the whole frame.

The encoding software can be embodied in a computer program product adapted to carry out the following functions when the software is loaded onto the respective device or devices and executed on one or more processing engines such as microprocessors, FPGA, ASIC etc.
treating the actual number of coding modes for per coding unit being independent of each other and/or
estimating the rate distortion cost comprising all coding modes by assuming said cost is proportional to a linear model of the rate distortion cost comprising less than all coding modes.

The encoding software can be embodied in a computer program product adapted to carry out the following functions when the software is loaded onto the respective device or devices and executed on one or more processing engines such as microprocessors, FPGA, ASIC etc.
an estimated rate distortion cost is linearly proportional to the rate distortion cost comprising all coding modes multiplied by the coefficient 0.87, 0.92, 0.94, 0.95 for the depth 0, 1, 2 and 3 respectively and/or evaluating two groups of modes, the first group comprising the 2N×2N merge mode and the second mode comprising all other modes.

The encoding software can be embodied in a computer program product adapted to carry out the following functions when the software is loaded onto the respective device or devices and executed on one or more processing engines such as microprocessors, FPGA, ASIC etc.
controlling based on a root-finding method such as a bisection method for example by executing the following steps:

```
σ ← σ₀
equal_sign ← True
function UPDATETHRESHOLD(C_T, C_R)
    if (σ ≥ 0 ) ≠ (C_R ≥ C_T) then
        σ ← σ / -2
        equal_sign ← False
    else
        if equal_sign then
            σ ← 2σ
        end if
        equal_sign ← True
    end if
    E_T ← max(0, E_T + σ)
end function
```

Other root finding methods can be used. There are two types of root finding methods, namely bracketed and open methods. Both bracketed and open methods can be used with embodiments of the present invention. Different root finding methods will have different performance characteristics, for example bracketed methods will converge but may take time to do so. Open methods may be quicker but do not necessarily always have a guarantee of convergence. Examples of root finding methods such as the bisection method include a false position method, the Brent Dekker method, Muller's method, Simple fixed point iteration method, Newton's method, multidimensional Newton's method, secant method etc.

The encoding software can be embodied in a computer program product adapted to carry out the following functions when the software is loaded onto the respective device or devices and executed on one or more processing engines such as microprocessors FPGA, ASIC etc. encoded images can be transmitted to a network for example.

The software mentioned above can be stored on a non-transitory signal storage medium, such as an optical disk (CD-ROM or DVD-ROM); a magnetic tape, a magnetic disk, a ROM, or a solid state memory such as a USB flash memory or similar.

The invention claimed is:

1. A method for adaptive use of image frame processing resources comprising a central processing unit connected to at least one memory, the central processing unit being configured to receive frames of a video signal, the method comprising:
   each frame being split into coding units comprising pixels,
   defining a threshold for a rate distortion cost error,
   a difference between a corresponding complexity and a complexity threshold is stored in the memory as a reference for a calculation of an updated rate distortion cost error threshold,
   wherein the difference between the complexity resulting from the updated rate distortion cost error threshold, and the former complexity threshold is smaller or equal to the difference between the former complexity and the complexity threshold,
   wherein the method is used for video compression, the image frame processing resources varying dynamically in time, wherein the video signal comprises image frames processed at a video rate, wherein an image frame is expressed in a number of coding units, a coding unit having a predefined maximum size, a controller being adapted to receive said image frame, the coding unit being encodable with a first number of different coding modes, the method further comprising:
   determining a rate distortion cost for a second number of different coding modes, the second number being less or equal to the first number of different coding modes for the specific coding unit, the difference between an estimated rate distortion cost for the first number and the rate distortion cost determined for the second number of coding modes is the rate distortion cost error, and the difference between the rate distortion cost error and a targeted rate distortion cost error has a minimum value for a certain coding mode, said coding mode is selected to encode the coding unit.

2. The method according to claim 1 comprising further:
   estimating an estimated rate distortion cost error as the difference between the lowest rate distortion cost amongst the determined rate distortion costs and an estimated lowest rate distortion cost amongst the first number of different coding modes,
   wherein, the chosen number of the second number of different coding modes is selected such that the difference between the rate distortion cost error and a target rate distortion cost error is minimised.

3. A method for adaptive use of image frame processing resources comprising a central processing unit connected to at least one memory, the central processing unit being configured to receive frames of a video signal, the method comprising:
   each frame being split into coding units comprising pixels,
   defining a threshold for a rate distortion cost error,
   a difference between a corresponding complexity and a complexity threshold is stored in the memory as a reference for calculation of an updated rate distortion cost error threshold,
   wherein the difference between the complexity resulting from the updated rate distortion cost error threshold, and the former complexity threshold is smaller or equal to the difference between the former complexity and the complexity threshold,
   recursively splitting coding units into a quad-tree structure of different coding units having levels and sub-levels, wherein in a quad-tree structure, each level or sub-level is recursively split into parts, a depth of a specific coding unit being defined by the number of recursive splits of coding units that have been used in order to reach the specific coding unit, wherein the size of the specific coding unit is the maximum size divided by the number of recursive splits, and
   wherein the coding unit at a certain depth being encodable with the second number of different coding modes, the determining of the second number being such as to maximise the use of dynamically for the encoder available image frame processing resources.

4. The method according to claim 3, further comprising normalizing a collection of pixels of a coding unit at level m and with index m, by dividing said coding unit with the number of pixels at the level m.

5. The method according to claim 1 comprising calculating a complexity for a frame in elapsed central processing unit processing time for encoding the whole frame.

6. The method according to claim 5 further comprising, for each frame, adapting a threshold of the rate distortion cost error, based on the difference between a reduced complexity and a value of a complexity target in a previous frame.

7. The method according to claim 1, wherein the actual number of coding modes for per coding unit are treated as independent of each other.

8. A method for adaptive use of image frame processing resources comprising a central processing unit connected to at least one memory, the central processing unit being configured to receive frames of a video signal, the method comprising:
   each frame being split into coding units comprising pixels,
   defining a threshold for a rate distortion cost error,
   a difference between a corresponding complexity and a complexity threshold is stored in the memory as a reference for calculation of an updated rate distortion cost error threshold,
wherein the difference between the complexity resulting from the updated rate distortion cost error threshold, and the former complexity threshold is smaller or equal to the difference between the former complexity and the complexity threshold, and
   estimating the rate distortion cost comprising all coding modes by assuming said cost is proportional to a linear model of the rate distortion cost comprising less than all coding modes,
   wherein an estimated rate distortion cost is linearly proportional to the rate distortion cost comprising all coding modes multiplied by the coefficient 0.87, 0.92, 0.94, 0.95 for the depth 0, 1, 2 and 3 respectively.

9. The method according to claim 1 comprising evaluating two groups of modes, the first group comprising the 2N×2N merge mode and the second group comprising all other modes.

10. The method according to claim 1 comprising a central processing unit implementing a controller based on a root-finding method.

11. The method according to claim 10, wherein the root-finding method is selected from a bisection method, a false position method, the Brent Dekker method, Muller's method, a Simple fixed point iteration method, Newton's method, the multidimensional Newton's method, and the secant method or similar.

12. The method according to claim 1 further comprising the following steps:
   setting initial value to the step size, assigning a variable equal_sign to True
   wherein if A and B can each be true or false, and A is the condition that the step size is larger than or equal to zero, and B is the condition that the reduced complexity is larger than or equal to the complexity threshold, and A is different from B, then
   reducing the step size to half and changing direction,
   setting the variable equal_sign to false
   wherein if A is equal to B and equal_sign is true, then double the step size without changing direction,
   setting the variable equal_sign to false, and letting the rate distortion cost error be increased by one step size unless this is smaller than zero, then letting the rate distortion cost error target be zero.

13. A system for adaptive use of image frame processing resources comprising:
   a central processing unit connected to at least one memory, the central processing unit being configured to receive frames of a video signal, each frame being split into coding units comprising pixels,
   the central processing unit defining a rate distortion cost error threshold, a difference between the corresponding complexity and a complexity threshold is stored in the memory as a reference for a calculation of an updated rate distortion cost error threshold,
   wherein the difference between the complexity resulting from the updated rate distortion cost error threshold, and the former complexity threshold is smaller or equal to the difference between the former complexity and the complexity threshold,
   wherein the system is configured to be used for video compression, wherein the image frame processing resources vary dynamically in time,
   wherein the video signal comprises image frames processed at a video rate, wherein an image frame is expressed in a number of coding units, a coding unit having a predefined maximum size,
   a controller being adapted to receive said image frame, the coding unit being encodable with a first number of different coding modes,
   wherein the central processing unit is configured to determine a rate distortion cost for a second number of different coding modes, the second number being less or equal to the first number of different coding modes for the specific coding unit, the difference between an estimated rate distortion cost for the first number and the rate distortion cost determined for the second number of coding modes is the rate distortion cost error, and the difference between the rate distortion cost error and a targeted rate distortion cost error has a minimum value for a certain coding mode, said coding mode is selected to encode the coding unit.

14. The system for adaptive use of image frame processing resources according to claim 13,
   wherein the central processing unit is further adapted to estimate an estimated rate distortion cost error as the difference between the lowest rate distortion cost amongst the determined rate distortion costs and an estimated lowest rate distortion cost amongst the first number of different coding modes,
   wherein, the chosen number of the second number of different coding modes is selected such that the difference between the rate distortion cost error and a target rate distortion cost error is minimised.

15. A non-transitory storage storing a computer program product comprising code that when executed on a processing engine executes the method steps of claim 1.

16. The method according to claim 3 further comprising the following steps:
   setting initial value to the step size, assigning a variable equal_sign to True
   wherein if A and B can each be true or false, and A is the condition that the step size is larger than or equal to zero, and B is the condition that the reduced complexity is larger than or equal to the complexity threshold, and A is different from B, then
   reducing the step size to half and changing direction,
   setting the variable equal_sign to false
   wherein if A is equal to B and equal_sign is true, then double the step size without changing direction, setting the variable equal_sign to false, and letting the rate distortion cost error be increased by one step size unless this is smaller than zero, then letting the rate distortion cost error target be zero.

17. The method according to claim 8 further comprising the following steps:

setting initial value to the step size, assigning a variable equal_sign to True wherein if A and B can each be true or false, and A is the condition that the step size is larger than or equal to zero, and B is the condition that the reduced complexity is larger than or equal to the complexity threshold, and A is different from B, then reducing the step size to half and changing direction, setting the variable equal_sign to false wherein if A is equal to B and equal_sign is true, then double the step size without changing direction, setting the variable equal_sign to false, and letting the rate distortion cost error be increased by one step size unless this is smaller than zero, then letting the rate distortion cost error target be zero.

\* \* \* \* \*